UNITED STATES PATENT OFFICE.

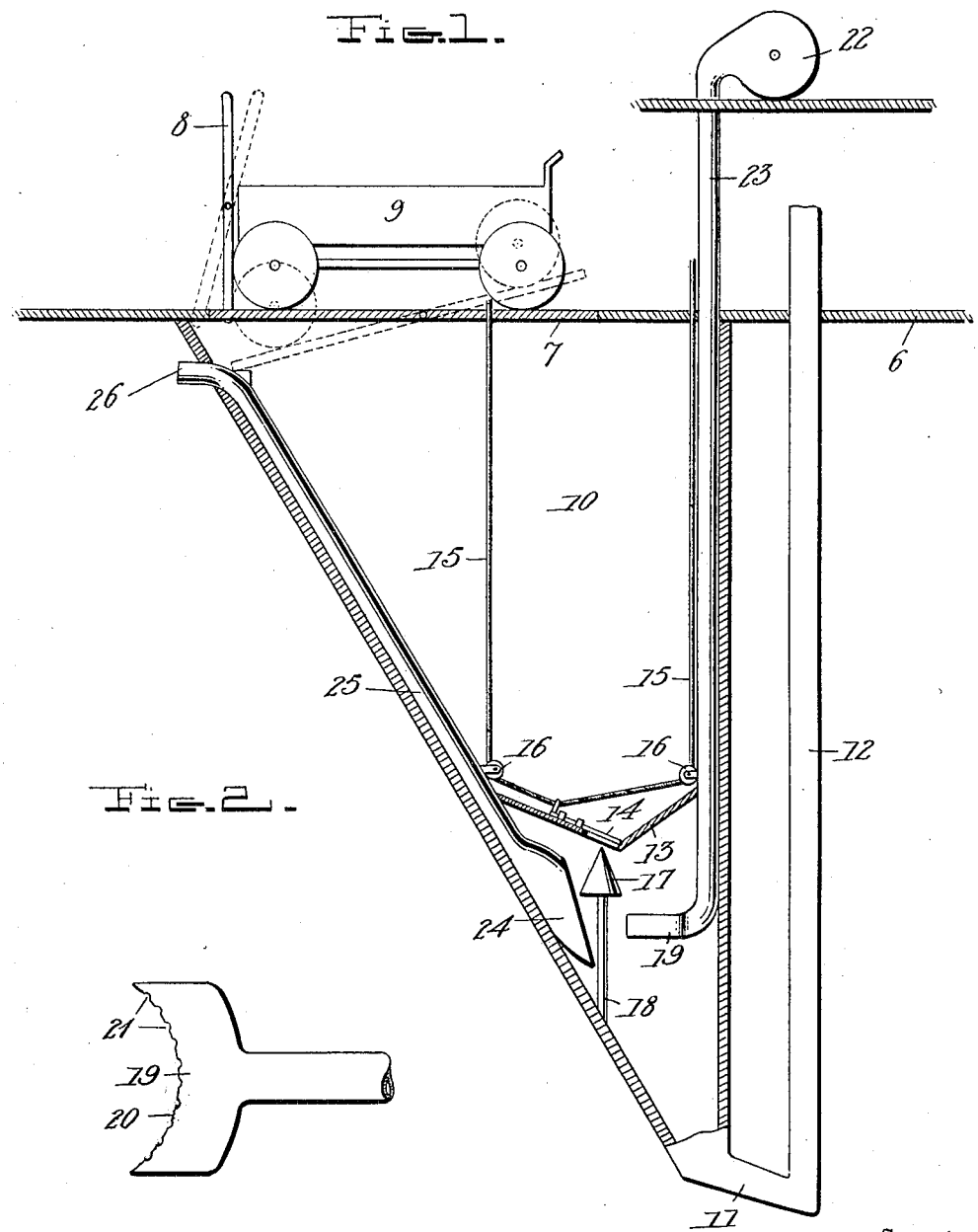

JOHN FEEHERY, OF CAMPUS, ILLINOIS.

GRAIN-SEPARATOR.

No. 856,455.   Specification of Letters Patent.   Patented June 11, 1907.

Application filed February 16, 1907. Serial No. 357,729.

*To all whom it may concern:*

Be it known that I, JOHN FEEHERY, a citizen of the United States, residing at Campus, in the county of Livingston and State of Illinois, have invented certain new and useful Improvements in Grain-Separators, of which the following is a specification.

This invention is a grain separator or cleaner designed particularly for use in connection with elevators, to clean the chaff and dirt from the grain after it is delivered from the wagon or other local transportation device and before it is conveyed into the elevator.

Grain as it comes to the elevator is frequently unclean or poorly separated, and dirt is frequently the cause of rotting or heating in the elevator bins.

The object of this invention is to provide an improved separator of the gravity type, utilizing an air blast to blow out the chaff and dirt as the grain passes from the dump to the conveyer of the elevator house.

The invention is illustrated in the accompanying drawings, in which

Figure 1 is a sectional elevation of the invention. Fig. 2 is a plan of the blower head.

Referring specifically to the drawings, 6 indicates a raised floor or driveway leading to the tilting dumping platform 7, which is controlled by a lever 8, the particular means for operating the platform and for holding a wagon 9 thereon forming no part of this invention.

Under the dump, in position to receive the grain from the wagon or other vehicle, is a hopper 10 which is connected at the bottom by a grain leg 11 to a conveyer 12 leading to another part of the elevator or elsewhere as desired. Located within the hopper is a false bottom 13 provided with an opening controlled by a slide valve 14 which may be opened or closed by means of ropes 15 which extend over guide pulleys 16 and thence out through the floor 6 in convenient position to be manipulated from above. Located directly under the said valve opening is a conical grain spreader 17, supported by a standard 18, and the grain falls on this spreader after passing the valve. Under the spreader is a blower head 19 having a curved face 20 provided with openings 21, the face being curved to extend partly around and close to the stream of grain which falls from the spreader. The blower head receives its blast from a fan 22, through the tube 23, the fan being preferably located above the floor and the tube extending conveniently down through the hopper. Located within the hopper, opposite to the blower head 19, is the enlarged mouth 24 of a tube 25 which extends upwardly at an incline along the side of the hopper, and discharges at 26 to waste.

In the operation of the invention, the grain is dumped from the wagon into the hopper by means of the tilting platform or otherwise, and by opening the valve 14 it flows out onto the spreader 17, under which the stream of grain passes through the blast delivered from the blower head 19, and any chaff, dirt and like matters are blown up through the pipe 25 and out to waste. The clean grain passes down through the leg 11 and into the conveyer, by which it may be taken to the bins of the elevator.

I claim:

1. In a grain separator, in combination, a hopper having sides which converge to an outlet at the lower end, a false bottom provided with a valve and extending between the side of the hopper at a distance above said outlet, forming a space in the lower part of the hopper under said false bottom, a spreader standing in said space under the valve, a blower head projecting in said space below the spreader, on one side, and a waste pipe having an enlarged mouth projecting into said space opposite the head.

2. In a grain separator, in combination, a hopper having a valve at the bottom, a conical spreader standing under the valve, a blower head located below and on one side of the spreader, and having a perforated face curved to extend partly around the stream of grain falling from the spreader, and a waste pipe the mouth of which is opposite to the head, on the other side of the spreader.

In testimony whereof I affix my signature, in presence of two witnesses.

JOHN FEEHERY.

Witnesses:
J. V. REILLY,
WILLIAM FLOOD.